United States Patent
Lam

(10) Patent No.: US 10,565,595 B2
(45) Date of Patent: Feb. 18, 2020

(54) SYSTEMS AND METHODS FOR DATA DESENSITIZATION

(71) Applicant: Visa International Service Association, San Francisco, CA (US)

(72) Inventor: Jer-Wei Lam, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 404 days.

(21) Appl. No.: 15/301,915

(22) PCT Filed: Apr. 29, 2015

(86) PCT No.: PCT/US2015/028364
§ 371 (c)(1),
(2) Date: Oct. 4, 2016

(87) PCT Pub. No.: WO2015/168333
PCT Pub. Date: Nov. 5, 2015

(65) Prior Publication Data
US 2017/0186007 A1 Jun. 29, 2017

Related U.S. Application Data

(60) Provisional application No. 61/986,558, filed on Apr. 30, 2014.

(51) Int. Cl.
*G06Q 20/40* (2012.01)
*G06Q 20/38* (2012.01)

(52) U.S. Cl.
CPC ......... *G06Q 20/409* (2013.01); *G06Q 20/385* (2013.01); *G06Q 20/4016* (2013.01); *G06Q 20/4018* (2013.01); *H04L 2209/56* (2013.01)

(58) Field of Classification Search
CPC .................................................. G06Q 20/20
(Continued)

(56) References Cited

U.S. PATENT DOCUMENTS 7,740,173 B2    6/2010  Von Mueller et al.
8,666,823 B2    3/2014  Spies et al.
(Continued)

FOREIGN PATENT DOCUMENTS

CN      1266240      9/2000
CN    102792325     11/2012
(Continued)

OTHER PUBLICATIONS

CN201580021637.1 , "Office Action", dated May 14, 2019, 18 pages.
(Continued)

*Primary Examiner* — Chinedu C Agwumezie
(74) *Attorney, Agent, or Firm* — Kilpatrick Townsend & Stockton LLP

(57) ABSTRACT

Systems and methods are provided to identify payment data and desensitize the payment data by a secure card reader. Desensitization of the payment data may include replacing sensitive information such as discretionary data with zeroes or other predetermined values. Desensitization may also include replacing sensitive information with fraud detection data such as merchant identifying information. Desensitization of the payment data may leave certain payment data intact for customer tracking or other non-payment related purposes.

23 Claims, 11 Drawing Sheets

(58) Field of Classification Search
USPC .......................................................... 705/35
See application file for complete search history.

(56) References Cited

U.S. PATENT DOCUMENTS

| | | | |
|---|---|---|---|
| 2005/0033686 A1* | 2/2005 | Peart | G06Q 20/00 |
| | | | 705/39 |
| 2008/0283591 A1 | 11/2008 | Oder et al. | |
| 2009/0008441 A1* | 1/2009 | Montgomery | G06Q 20/346 |
| | | | 235/379 |
| 2009/0012896 A1 | 1/2009 | Arnold | |
| 2009/0030845 A1 | 1/2009 | Hurry et al. | |
| 2009/0125446 A1* | 5/2009 | Saunders | G06K 9/00 |
| | | | 705/67 |
| 2010/0299267 A1 | 11/2010 | Faith et al. | |
| 2011/0010289 A1 | 1/2011 | Kranzley | |
| 2012/0022957 A1 | 1/2012 | Sun et al. | |
| 2012/0023567 A1 | 1/2012 | Hammad | |
| 2012/0143754 A1 | 6/2012 | Nardendra | |
| 2014/0291393 A1 | 10/2014 | Hyslop et al. | |
| 2014/0298027 A1* | 10/2014 | Roberts | H04L 9/0869 |
| | | | 713/171 |

FOREIGN PATENT DOCUMENTS

| | | |
|---|---|---|
| CN | 103685284 | 3/2014 |
| RU | 2232418 | 7/2004 |
| RU | 2413991 | 3/2011 |
| WO | 2011127177 A2 | 10/2011 |

OTHER PUBLICATIONS

International Search Report / Written Opinion, dated Jul. 27, 2015 ,in PCT Application No. PCT/US2015/028364, 9 pages.
RU2016146744 , "Office Action", dated Nov. 6, 2018, 17 pages.

* cited by examiner

| | |
|---|---|
| TRACK 1 AND TRACK 2 DATA PRE-DESENSITIZATION 902 | %B4000123456789010^SMITH/JOHN^16071021473810559010203?<br>;4000123456789010=160710212423468? |
| TRACK 1 AND TRACK 2 DATA POST-DESENSITIZATION 904 | %B4000123456789010^0000000000^00000000000000000000000?<br>;4000123456789010=000000000000000? |
| TRACK 1, TRACK 2 AND LOYALTY DATA PRE-DESENSITIZATION 906 | %B4000123456789010^SMITH/JOHN^16071021473810559010203?<br>;4000123456789010=160710212423468?<br>;81293812 |
| TRACK 1, TRACK 2 AND LOYALTY DATA POST-DESENSITIZATION 908 | %B4000123456789010^0000000000^00000000000000000000000?<br>;4000123456789010=000000000000000?<br>;81293812 |
| TRACK 1 AND TRACK 2 DATA POST-DESENSITIZATION (FRAUD DETECTION) 910 | %B4000123456789010^0000000000^93787221000000000000000?<br>;4000123456789010=000000000000000? |
| TRACK 1 AND TRACK 2 DATA POST-DESENSITIZATION (FRAUD DETECTION) 912 | %B4000123456789010^0000000000^72638592647259280000000?<br>;4000123456789010=937872210000000? |
| TRACK 1 AND TRACK 2 DATA POST-DESENSITIZATION (FRAUD DETECTION) 914 | %B4000122323239010^0000000000^00000000000000000000000?<br>;4000122323239010=000000000000000? |
| TRACK 1 AND TRACK 2 DATA POST-DESENSITIZATION (FRAUD DETECTION) 916 | %B4000232323239010^0000000000^00000000000000000000000?<br>;4000232323239010=000000000000000? |

FIG. 9

SYSTEMS AND METHODS FOR DATA DESENSITIZATION

CROSS-REFERENCES TO RELATED APPLICATIONS

This application is a National Stage of International Application No. PCT/US2015/028364 filed Apr. 29, 2015, and which claims the benefit of U.S. Patent Application No. 61/986,558 filed Apr. 30, 2014, of which are all herein incorporated by reference.

BACKGROUND

The present invention relates to desensitization of payment data. In some markets, merchants may use separate devices to obtain authorization for payment transactions and for tracking consumer data. For example, some merchants may use electronic data capture terminals provided by issuers (e.g. banks) to obtain authorization from the issuers for payment transactions. A separate merchant computer may be used for tracking consumer data for accounting or loyalty purposes. Since the electronic data capture terminals and the merchant computer are not integrated, this can lead to a practice called "double swiping." Double swiping can refer to a second swipe of a payment card at a merchant terminal after the first swipe to obtain initial authorization from the bank. The second swipe is commonly performed to track customer details within a merchant's system, for accounting or loyalty purposes. The second swipe can expose all of the data from the payment card, and is often performed on a less secure merchant terminal. These less secure terminals can then be targeted for hacking or bugging to obtain card data. This can undermine the integrity of the payment system, and diminish consumer trust in a merchant's business.

Embodiments of the invention address these and other problems, individually and collectively.

SUMMARY

Embodiments of the invention provide systems and methods to identify payment data and desensitize the payment data using a secure card reader. For example, a consumer may perform a first swipe of a payment card at a merchant point-of-sale terminal to obtain authorization for a financial transaction from an issuer. The merchant may then perform a second swipe of the payment card at a secure card reader for tracking consumer data. In accordance with some embodiments of the invention, the secure card reader may identify the payment data, desensitize the payment data and provide the desensitized data to a merchant computer. The desensitized data may include a portion of the payment data that may not be same as the data before desensitization. In some embodiments, the secure card reader may desensitize only the discretionary part of the payment data in order to prevent tampering with the discretionary data for counterfeiting purposes.

According to an aspect, a method is provided comprising receiving, by a reader, device data from a payment device; identifying, by the reader, a first portion of the device data and a second portion of the device data comprising sensitive information; desensitizing, by the reader, the second portion of the device data to remove the sensitive information by replacing at least some of the sensitive information with fraud detection data; providing, by the reader, the first portion of the device data and the desensitized second portion of the device data to a merchant computer communicatively coupled to the reader.

In some embodiments, the first portion of the device data can comprise a primary account number or a payment token associated with the primary account number. The second portion of the device data can include discretionary data. The discretionary data can include a Card Verification Value (CVV). The fraud detection data can be indicative of a merchant, a merchant terminal, a location, or timing information associated with the device data.

In some embodiments, desensitizing the second portion of the device data further comprises replacing the second portion of the device data with zeroes.

In some embodiments, the method further comprises generating an authorization request message based on the device data and transmitting the authorization request message to an acquirer computer communicatively coupled to the reader.

According to another aspect, a method is provided receiving, by a reader, device data from a payment device; identifying, by the reader, a first portion of the device data comprising a primary account number or a payment token associated with the primary account number and a second portion of the device data comprising sensitive information; desensitizing, by the reader, the second portion of the device data to remove the sensitive information; and providing, by the reader, the first portion of the device data and the desensitized second portion of the device data to a device communicatively coupled to the reader.

In some embodiments, desensitizing the second portion of the device data comprises replacing at least some of the second portion of the device data with zeroes. In some embodiments, desensitizing the second portion of the device data comprises replacing at least some of the sensitive information with fraud detection data. The fraud detection data can comprise a merchant identifier or a device identifier. In some embodiments, the sensitive information includes discretionary data.

In some embodiments, the card reader is not configured to transmit a payment authorization request. In some embodiments, the reader is part of at least one of a merchant terminal, a hotel room door, or an airline check in kiosk.

According to another aspect, a secure reader is provided comprising a processor and a computer readable medium coupled to the processor, the computer readable medium comprising code for causing the processor to: receive device data from a payment device; identify a first portion of the device data comprising a primary account number or a payment token associated with the primary account number and a second portion of the device data comprising sensitive information; desensitize the second portion of the device data to remove the sensitive information; and provide the first portion of the device data and the desensitized second portion of the device data to a device communicatively coupled to the secure reader.

In some embodiments, desensitizing the second portion of the device data comprises replacing at least some of the second portion of the device data with zeroes. In some embodiments, desensitizing the second portion of the device data comprises replacing at least some of the sensitive information with fraud detection data. The fraud detection data can comprise a merchant identifier or a device identifier. In some embodiments, the sensitive information includes discretionary data.

In some embodiments, the code further causes the processor to generate an authorization request message based on the device data; and transmit the authorization request message to an acquirer computer communicatively coupled to the secure reader.

These and other embodiments of the invention are described in further detail below.

BRIEF DESCRIPTION OF THE DRAWINGS

FIG. 9 illustrates a table with examples of desensitization of some portions of payment data, in accordance with embodiments.

DETAILED DESCRIPTION

Figure 1:
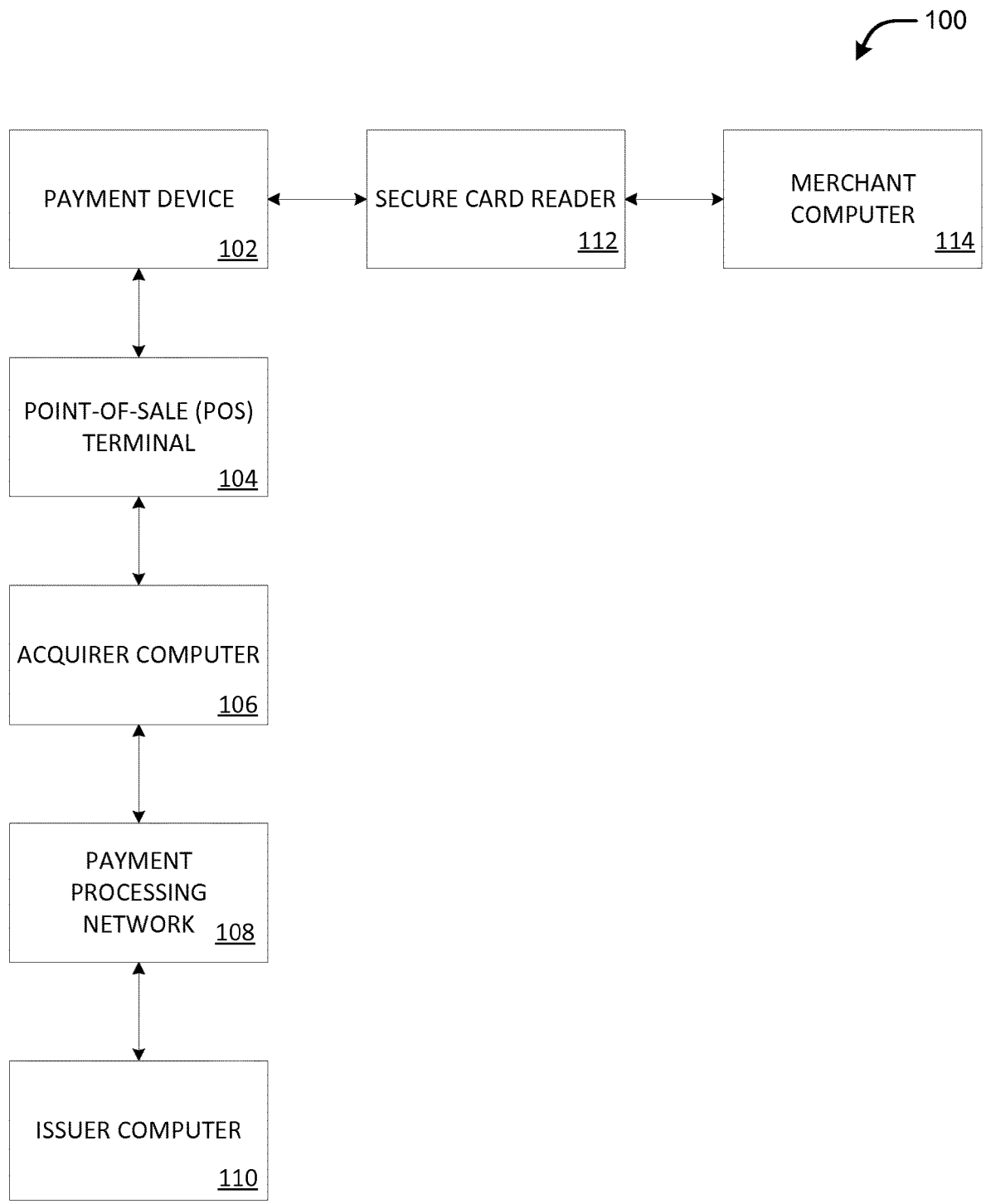
FIG. 1 illustrates an exemplary system for desensitizing data, in accordance with embodiments.

Embodiments of the invention provide systems and methods to identify payment data and desensitize the payment data using a secure card reader. For example, a consumer may perform a first swipe of a payment card at a merchant point-of-sale terminal to obtain authorization for a financial transaction from an issuer. The merchant may then perform a second swipe of the payment card at the secure card reader for tracking consumer data. In accordance with some embodiments of the invention, the secure card reader may identify the payment data, desensitize the payment data and provide the desensitized data to a merchant computer. The desensitized data may include a portion of the payment data that may not be same as the data before desensitization. In some embodiments, the secure card reader may desensitize only the discretionary part of the payment data in order to prevent tampering with the discretionary data for counterfeiting purposes. In some embodiments, desensitization can include replacing sensitive information with fraud detection data such as a merchant identifier or a merchant device identifier so as to facilitate detection of a fraud.

In most cases, where double swiping is practiced, the second swipe is unrelated to authorization or settlement of the transaction but is used to create a secondary record to support the merchant accounting, reporting or customer-relationship management programs (e.g., loyalty and rewards). However, the second swipe of a payment card can expose the full track data encoded in the magnetic stripe of the payment card to compromise. For example, the full track data may include track 1 and track 2 data for financial cards. Track 1 data may include a Primary Account Number (PAN), a consumer name, an expiration date, a service code, and discretionary data such as a Card Verification Value (CW) or a Card Verification Code (CVC) and any other relevant data. A PAN can conform to the ISO 7812 standard and comprise an Issuer Identification Number (IIN) or Bank Identification Number (BIN) portion and a personal account number portion. Track 2 data may include a PAN, an expiration date, a service code, and discretionary data as in Track 1 and any other relevant data. A POS terminal may read track 1 data and/or track 2 data. For example, in most cases, a primary account number may match a credit card number printed on the payment card and may be 19 characters long. An expiration date may be 4 characters long and a CW or CVC may be 3 characters long. For less secure merchant computers that are vulnerable to tampering, track data may be compromised for counterfeit fraud purposes such as counterfeit payment cards.

In accordance with embodiments of the invention, a secure card reader can identify payment card data (e.g., ISO 7813 format) received from a payment device and can desensitize the payment data before providing the payment data to a merchant computer. For example, a portion of the payment data may include discretionary data such as the CW or CVC that may be required to make a counterfeit card. In some embodiments, desensitizing the data may include changing the CW or CVC value to a certain predetermined value such as zeroes. By desensitizing payment data (such as the discretionary data) read by the secure card reader, attacks, for example, using USB keyloggers or malware keyloggers, may not yield full track data thus preventing the counterfeiting of payment cards using this data. For instance, an unauthorized entity that obtains the desensitized data may only be able to extract some information (e.g., personal account number or a token) but not all the necessary information (e.g., discretionary data such as CW) that is required by payment processing networks and/or issuers to authorize payment transactions. Furthermore, desensitization can include replacing sensitive information with fraud detection data such as a merchant identifier or a merchant device identifier so as to facilitate detection of a fraud. For instance, an unauthorized entity that obtains and uses such desensitized data as payment data can be easily identified. The desensitized data may be provided to a merchant computer that may be used by a merchant back-end system for processing related to loyalty programs, accounting, charge-back monitoring, etc. Embodiments of the invention may be used with existing POS devices without any updates to the POS software/hardware.

Prior to discussing embodiments of the invention, description of some terms may be helpful in understanding embodiments of the invention.

An "access device" may be any suitable device for accessing a remote computer. In some embodiments of the invention, an access device may communicate with a merchant computer or a payment processing network, and may interact with a portable device, a user computer apparatus, and/or a user mobile device. An access device may generally be located in any suitable location, such as at the location of a merchant. An access device may be in any suitable form. Some examples of access devices include point of sale (POS) devices, card readers, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable device.

"Desensitization" may include removing or changing sensitive information. For example, desensitizing data may include removing sensitive information from the data by changing the data. In some embodiments, portions of the full track data read from a payment device may be desensitized. In some embodiments, desensitizing data may include replacing portions of the data with a predetermined value (such as zeroes or an alphanumeric string) or an identifier that may be used to identify, alone or in combination, a merchant name, a location, a merchant terminal or a date and time. For example, in some embodiments, the desensitized data may include all 7s corresponding to merchant A or all 5s corresponding to merchant B. In some embodiments, the desensitized data may include an identifier (e.g., an alphanumeric string) that comprises a merchant identifier and a terminal identifier at a merchant location. In some embodiments, desensitized data may refer to the particular portion of payment data that has been changed (e.g., payment data may include a first portion that has not been altered and a desensitized portion that has been replaced with a predetermined value). In some embodiments, desensitized data may refer to any payment data that has had at least a portion of data removed or replaced. In some cases, desensitization of a piece of data renders the data permanently removed or erased. The removed or erased data may not be recoverable based on the desensitized data. Such methods of desensitization can include replacing the data with values that have no relationship to the replaced data (e.g., zeroes, random values, merchant identifiers) or truncating the data or encrypting the data and destroying the cryptographic key. In other cases, desensitization of a piece of data renders the data inaccessible to unauthorized entities but accessible to or recoverable by authorized entities. For instance, the data may be encrypted using a cryptographic key that is only accessible to authorized entities. Unauthorized entities would not be able to decipher the encrypted data without the cryptographic key whereas authorized entities would be able to decrypt the data using the cryptographic key and hence recover the data.

A "payment device" may refer to any device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. If the payment device is in the form of a debit, credit, or smartcard, the payment device may also optionally have features such as magnetic stripes. Such devices can operate in either a contact or contactless mode. Device data can refer to any information obtained from a payment device.

"Payment data" may include data associated with a payment transaction. The payment data may be used (e.g., by an issuer) to approved or decline the transaction. Payment data includes device data collected from a payment device (e.g., credit card or bank card) and/or a cardholder. For example, payment data can include track data encoded in the magnetic stripes of the payment device. Payment data can also include authentication data provided by customers themselves such as a signature, a personal identification number (PIN), or a security code (e.g., a Card Verification Value 2, or CVV2). In an example, payment data may include a payment account number (PAN), an expiration date, a consumer name, a personal identifier number, a CVV or a CVC value, etc. In some embodiments, a first portion of the data may include non-discretionary data and a second portion of the data may include discretionary data. In some embodiments, the discretionary data can include a name, a Pin Verification Key Indicator (PVKI, 1 character), a PIN Verification Value (PVV, 4 characters), a Card Verification Value or a Card Verification Code (CVV or CVC, 3 characters). In some embodiments, the non-discretionary data may include a payment account number (PAN) or a token (described below), a loyalty account number, etc.

"Sensitive payment data" can include a portion of the payment data that requires desensitization before being transmitted, stored, and/or processed. For instance, sensitive payment data can include sensitive authentication data stored in a discretionary data field of track data. Such sensitive authentication data can include a PVKI, a PW, and a CVV or CVC typically stored in Track 1 and/or Track 2 of a payment card. In some other cases, sensitive payment data can include identifying information of a cardholder or account such as cardholder name.

A "token" may include a substitute identifier for information. For example, a payment token may include an identifier for a payment account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Fraud detection data" may include any data identifying a particular entity or step involved in a given transaction or a process so as to enable detection a fraud or compromise at the particular entity of step. For instance, fraud detection data can include information identifying when and/or where a given data operation takes place. The data operation may include transmitting, receiving, processing, storing, or retrieving data. Data operation can include data desensitization as discussed herein. Fraud detection data can include information identifying the entity (e.g., a business entity and/or a computing device) associated with a given data operation. Such entity identifying information can include, for example, a merchant identifier that uniquely identifies a merchant (e.g., an alphanumeric string containing a name or identifier), a merchant category code (MCC), a merchant location, a device or terminal identifier that uniquely identifies a terminal or device (e.g., a merchant POS terminal), and the like. Fraud detection data can also include location and/or timing information (e.g., timestamp) associated with certain data operations.

A "secure card reader" may include a secure device for reading payment cards. For example, in some embodiments, a secure card reader may be a device configured to read payment data from a payment device and to desensitize a portion of the payment data. In some embodiments, desensitizing a portion of the payment data may include changing the value of that portion of the payment data. For example, the value may be changed to a different value, e.g., all zeroes. The secure card reader may be configured to replace at least a portion of the sensitive payment data with fraud detection data.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CW (card verification value), a dCVV (dynamic card verification value), a PAN (primary account number or "account number"), a token (e.g., PAN substitute), a user name, an expiration date, etc. An authorization request message may also comprise "transaction information," such as any information associated with a current transaction, such as the transaction amount, merchant identifier, merchant location, acquirer bank identification number (BIN), card acceptor ID, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

FIG. 1 illustrates an exemplary system 100 for desensitizing data, in accordance with embodiments. The system 100 may include a payment device 102, a point-of-sale (POS) terminal 104, an acquirer computer 106, a payment processing network 108, an issuer computer 110, a secure card reader 112 and a merchant computer 114.

The payment device 102 may be used by a consumer to conduct a financial transaction. The payment device 102 may be in the form of a payment card (e.g., debit cards, credit cards, loyalty cards, prepaid cards, etc.) or a mobile device (e.g., cellular phones, laptops, tablets, personal digital assistants (PDAs), key chain devices, etc.). In some embodiments, the payment device 102 may be configured to communicate with one or more wireless networks (e.g., cellular networks, Wi-Fi, etc.). For example, if the payment device 102 is a mobile phone, it may be configured to communicate with a mobile network.

In some embodiments of the invention, the payment device 102 may be a chip based payment device, for example, an EMV (Europay, MasterCard® and Visa®) chip card. For example, the payment device 102 may include a payment card with an embedded microprocessor chip in addition to the standard magnetic stripes. The embedded chip may protect and store cardholder's data. A consumer (e.g., the cardholder) can be authenticated with a PIN or a signature to complete a transaction using their chip card.

The point-of-sale (POS) terminal 104 may be configured to receive payments conducted using payment devices such as the payment device 102. For example, the POS terminal 104 may be an electronic data capture (EDC) terminal that can read information encoded in an EMV chip based payment card and transmit that information to a payment processing network/issuer for authorization/settlement of the transaction. In some embodiments, the POS terminal 104 may be in the form of a contactless reader which can read the EMV chip data on a payment device when the consumer taps or waves the payment device in its vicinity. The POS terminal 104 may include a computer that may be configured to communicate with one or more entities using one or more communication networks for authorization and settlement of the transaction. For example, when a consumer swipes or dips the payment device 102 at the POS terminal 104, the POS terminal 104 may generate an authorization request message and send the authorization request message to the payment processing network 108 via the acquirer computer 106. It is understood that in various embodiments, various types of access device may be used including but not limited to the POS terminal.

An acquirer is typically a system for an entity (e.g., a bank) that manages an account for a particular merchant or other entity. The acquirer computer 106 may route the authorization request message for the transaction to the issuer computer 110 via the payment processing network 108.

The payment processing network 108 may include data processing subsystems, networks, and operations used to support and deliver authorization services, and clearing and settlement services. An example of payment processing network 108 includes VisaNet®, operated by Visa®. The payment processing network 108 may include wired or wireless network, including the internet. The payment processing network 108 may forward the authorization request message to the issuer 110.

An issuer is typically a business entity (e.g., a bank) that may have issued a payment card (e.g., credit or debit), account numbers, or payment tokens used for the transactions. Some systems can perform both issuer and acquirer functions. When a transaction involves a payment account associated with the issuer computer 110, the issuer computer 110 may verify the account and respond with an authorization response message to the acquirer computer 106 via the payment processing network 108 that may forward it to the POS terminal 104. The authorization response message may include an identifier to describe whether the transaction was approved or declined. The POS terminal 104 may communicate to the consumer about the outcome of the authorization based on the authorization response message.

At a later time (e.g., at the end of the day), a clearing and settlement process can occur between the acquirer computer 106, the payment processing network 108, and the issuer computer 110.

As illustrated in FIG. 1, the POS terminal 104 and the merchant computer 114 are not integrated or are not configured to communicate with each other. Therefore, a merchant may have to perform multiple interactions of the payment device 102 with different systems to retrieve the relevant information from the payment device 102 that may be used by those systems. Each additional device that reads the payment device 102 presents a potential target that, if compromised, may expose the track data encoded in the payment device 102. For example, in some embodiments, a second swipe of the payment device 102 may be performed at the secure card reader 112 after the first swipe at the POS terminal 104. For example, the second swipe of the payment card can be a swipe of the magnetic stripe at the secure card reader 112. The second swipe may not be related to authorization/settlement and may be utilized by a merchant back-end system for accounting, charge-back monitoring, loyalty programs, etc. The second swipe of the payment device 102 may enable the secure card reader 112 to capture the payment data associated with a consumer account. For example, the payment data may include full track data encoded in the magnetic stripes of the payment device 102. In some embodiments, the second swipe of the payment device 102 may capture loyalty data with or without the full track data associated with a consumer's account. In some embodiments, the loyalty data may be determined from some portions of the full track data (e.g., PAN). It will be understood that the magnetic stripe data may include encoded data associated with a consumer's financial account, loyalty account, personal identification account and any other suitable data, alone or in combination, that may be used to track consumer account.

According to some embodiments of the invention, the secure card reader 112 may not be configured to or programmed to transmit a payment authorization request. Rather, secure card reader 112 may be configured to desensitize a portion of the payment data using methods described herein. The secure card reader 112 may be configured to identify a first portion of the payment data and a second portion of the payment data. For example, the first portion of the payment data may include a payment account number or a payment token associated with the payment account number, loyalty data, a personal identifier or any other non-discretionary data that may not be sufficient by itself to make counterfeit cards but may be used by the merchant computer 114 for accounting, reporting, or customer-relationship management programs. In some embodiments, the second portion of the payment data may include the discretionary data such as the consumer name, CVV or CVC or any other sensitive data. The secure card reader 112 may be configured to desensitize the second portion of the payment data and provide the desensitized second portion of the payment data along with the first portion of the payment data to the merchant computer 114. Alternatively or additionally, the desensitized second portion of the payment data along with the first portion of the payment data may be provided to a data store (not shown) operably connected to the secure card reader 112 and/or the merchant computer 114. In some embodiments, the desensitized second portion of the payment data may include data that is different than the data captured by the secure card reader 112 from the payment device 102. For example, the desensitized second portion of the payment data may include predetermined values (e.g., zeroes) or random values. As another example, the desensitized second portion of the payment data may include fraud detection data such as merchant identifier, device identifier, timestamp, location information, and the like so as to enable detection and/or tracking of fraud activities.

In some embodiments, the secure card reader 112 may be configured as a plug-and-play device that may be coupled to a merchant computer without requiring any updates to the merchant computer system or to the POS terminal. For example, the secure card reader 112 may replace an existing card reader without requiring any changes to the interface. In some embodiments, the secure card reader 112 may be connected to the merchant computer 114 using an existing USB connection without requiring any changes in the data format for communication with the merchant computer 114.

The merchant computer 114 may be configured to communicate with the secure card reader 112 via a wired or wireless connection. The merchant computer 114 may receive the payment data which may include a desensitized portion that may not be useful for counterfeit purposes. The merchant computer 114 may use the first portion of the payment data provided by the secure card reader 112 for accounting and loyalty programs. It should be understood that, in various embodiments, any suitable device (e.g., storage device, host computer, server computer, portable device, etc.) may be used instead or in addition to the merchant computer to receive desensitized information from the secure card reader. The device that receives the desensitized information may or may not be provided by the same entity as the provider of the secure card reader.

Figure 2:
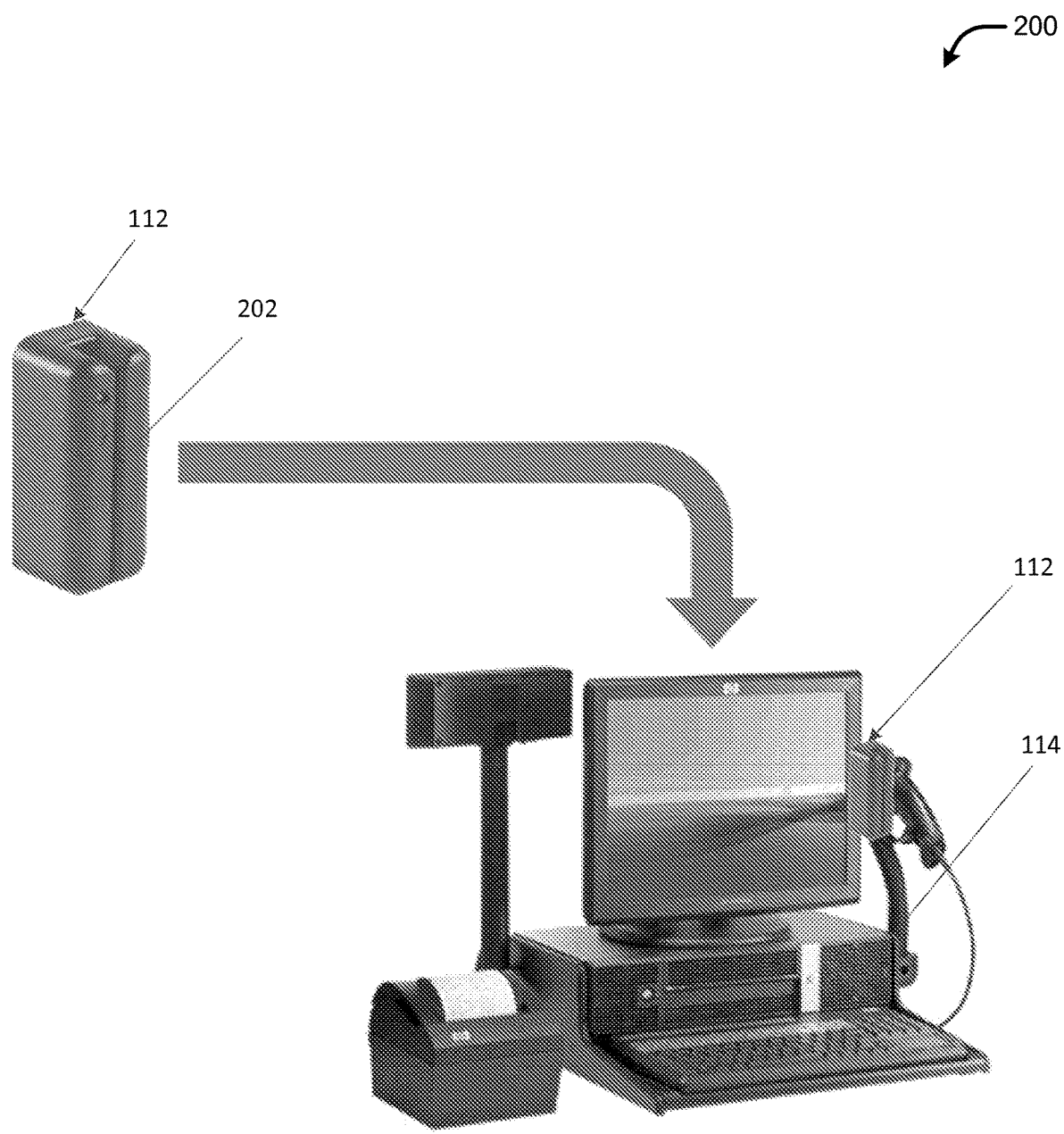
FIG. 2 illustrates in further detail a secure card reader and a merchant computer, in accordance with embodiments.

FIG. 2 illustrates in further detail the secure card reader 112 and the merchant computer 114 as shown in FIG. 1, in accordance with embodiments.

In some embodiments, the secure card reader 112 may include a slot 202 where a consumer can insert or swipe the magnetic stripe of the payment device 102. In some embodiments, the secure card reader 112 may include a magnetic reading head configured to read the magnetic stripe data. In some embodiments, the mobile device 102 may be waved or tapped in proximity of the secure card reader 112. For example, the secure card reader 112 may be configured to communicate with the payment device 102 using radio waves or Near Field Communication (NFC) technology. The secure card reader 112 may also include a processor and a computer readable medium coupled to the processor, wherein the computer readable medium may comprise code for causing the processor to implement methods in accordance with embodiments of the invention. For example, the computer readable medium may comprise code for receiving payment data from a payment device (e.g., payment device 102), identifying a first portion of the payment data and a second portion of the payment data, desensitizing the second portion of the payment data and providing the first portion of the payment data and the desensitized second portion of the payment data to the merchant computer 114 communicatively coupled to the secure card reader 112. It is understood that in various embodiments, various types of access device may include or be included by the secure card reader.

The system configuration discussed in FIGS. 1-2 can be configured to provide data security to an existing merchant transaction system in a cost-effective manner. The cost of the secure card reader 112 can be relatively low. Additionally, the secure card reader 112 can be integrated to an existing merchant system with little or no changes to existing components. For example, the secure card reader can configured as a plug-and-play device that may be coupled to a merchant computer without requiring any updates to the merchant computer system or to the POS terminal.

Figure 3:
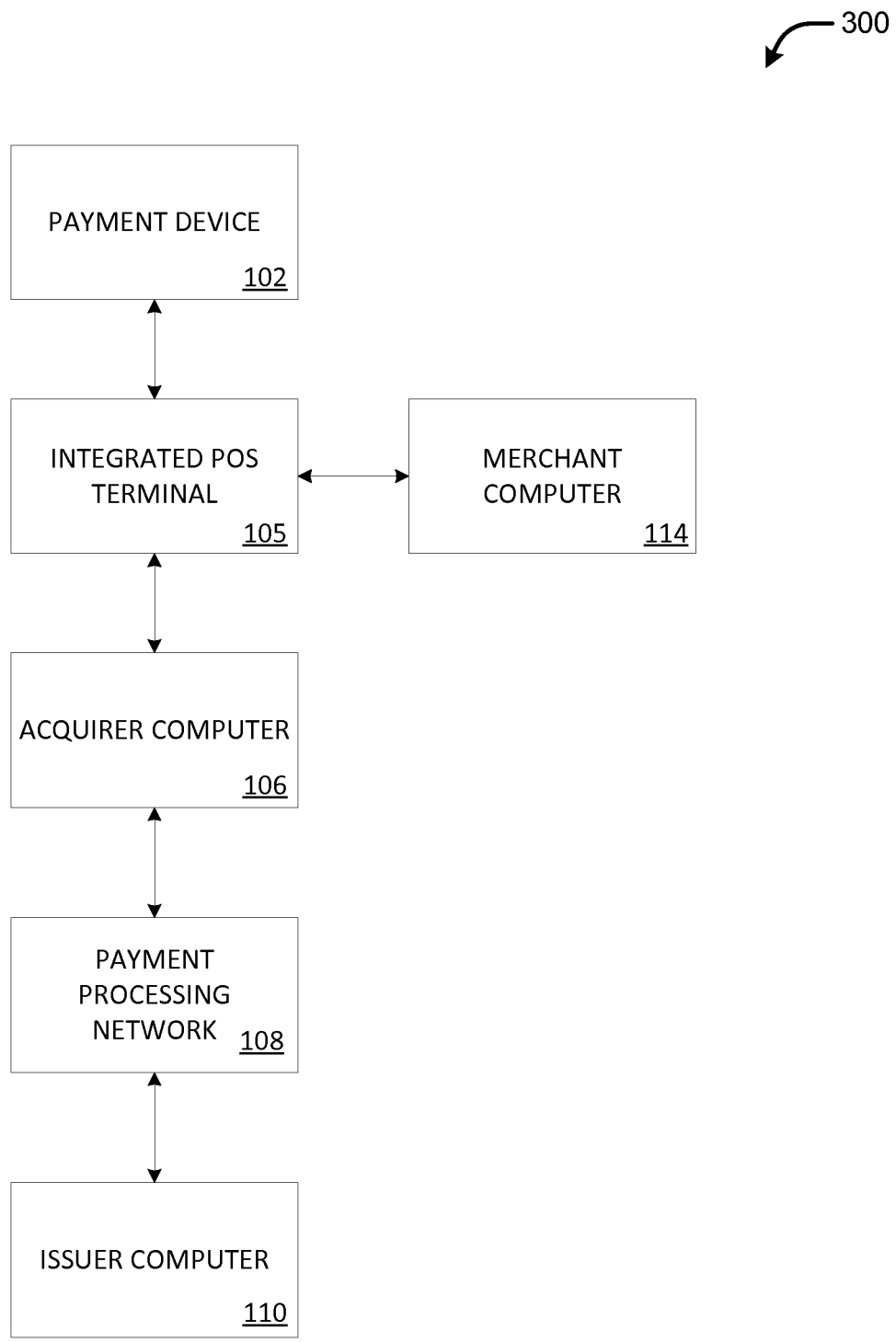
FIG. 3 illustrates another exemplary system for desensitizing data, in accordance with embodiments.

FIG. 3 illustrates another exemplary system 300 for desensitizing data, in accordance with embodiments. The system 300 is similar to the system 100 discussed in FIG. 1, except a single integrated POS terminal 105 is provided that combines the functionalities of the POS terminal 104 and the secure card reader 112 of FIG. 1. For example, the integrated POS terminal 105 can be an EDC terminal configured to capture the payment data for authorization and settlement. Certain fields of the payment data (e.g., full track data) may be stripped off to desensitize the data. The desensitized data such as the account number may be sent to the cash register for accounting purposes without exposing the full track data. It is understood that in various embodiments, various types of access device may include or be included by the integrated POS terminal.

The integrated POS terminal 105 may be configured process payment transactions similar to the POS terminal 104 discussed in FIG. 1. For example, the integrated POS terminal 105 may be configured to receive payment data (e.g., full track data) from the payment device 102 (via a swipe or dip the payment device 102 at the integrated POS terminal 105), generate an authorization request message, send the authorization request message to the payment processing network 108 via the acquirer computer 106, receives an authorization response message from the acquirer computer 106, and communicating the authorization results to a user or the merchant computer 114.

The integrated POS terminal 105 may also be configured to provide desensitized payment data to the merchant computer similar to the secure card reader 112 discussed in FIG. 1. For instance, the integrated POS terminal 105 may be configured to identify a portion of the payment data that requires desensitization. In an embodiment, the portion of payment data to be desensitized does not include a PAN or a payment token associated with the PAN. The PAN or token may be needed or required further downstream by a merchant for chargeback, accounting, or tracking purposes. In another embodiment, at least a portion of the PAN (e.g., certain digits of the PAN) may be desensitized. The integrated POS terminal 105 may be configured to desensitize the identified data portion by replacing the data portion at least partially with fraud detection data. The fraud detection data may include information identifying the merchant, merchant location, device (e.g., the integrated POS terminal), timestamp, and the like associated with the processing of the payment data. Alternatively or additionally, the integrated POS terminal 105 may be configured to desensitize the identified data portion by replacing the data portion with zeroes or other predetermined values. The integrated POS terminal 105 may be configured to provide the desensitized payment data to the merchant computer 114. The desensitized payment data may include a portion of the payment data that is not desensitized (e.g., a PAN or token) and a portion of the payment data that has been desensitized (e.g., the discretionary data of the track data that has been replaced with zeroes or fraud detection data). In some cases where sensitive information is removed or truncated, the desensitized payment data that is provided to the merchant computer 114 may include only the portion of the payment data that is not desensitized. Alternatively or additionally, desensitized payment data may be provided to a data store (not shown) or any suitable device operably connected to the integrated POS terminal 105 and/or the merchant computer 114.

In various embodiments, the desensitization of payment data may occur substantially concurrently with, before, or after the payment authorization. For instance, once the payment data is received, the generation of authorization request may occur independently from the desensitization of the payment data. In another example, the generation of the authorization request may occur before or after the desensitization of the payment data.

It should be understood that, in various embodiments, any suitable device (e.g., storage device, host computer, server computer, portable device, etc.) may be used instead or in addition to the merchant computer to receive desensitized information from the integrated POS terminal. The device that receives the desensitized information may or may not be provided by the same entity as the provider of the integrated POS terminal.

Figure 4:
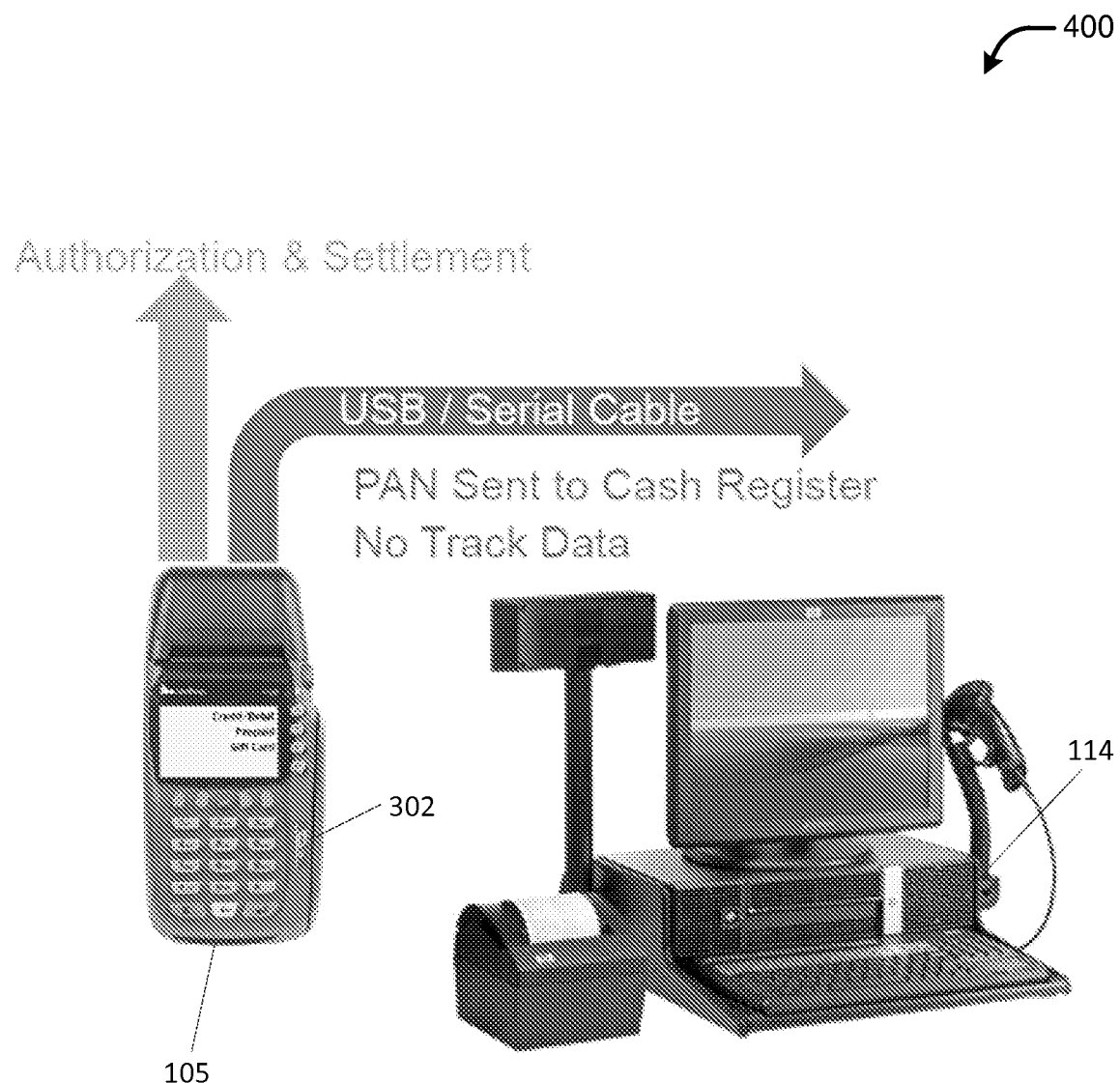
FIG. 4 illustrates in further detail an integrated POS terminal and a merchant computer, in accordance with embodiments.

FIG. 4 illustrates in further detail the integrated POS terminal 105 and the merchant computer 114 as shown in FIG. 3, in accordance with embodiments.

In some embodiments, the integrated POS terminal 105 may include a slot 302 where a consumer can insert or swipe the magnetic stripe of the payment device 102. In some embodiments, the integrated POS terminal 105 may include a magnetic reading head configured to read the magnetic stripe data. In some embodiments, the mobile device 102 may be waved or tapped in proximity of the integrated POS terminal 105. For example, the integrated POS terminal 105 may be configured to communicate with the payment device 102 using radio waves or Near Field Communication (NFC) technology. The integrated POS terminal 105 may also include a processor and a computer readable medium coupled to the processor, wherein the computer readable medium may comprise code for causing the processor to implement methods in accordance with embodiments of the invention. For example, the computer readable medium may comprise code for receiving payment data from a payment device (e.g., payment device 102), generating and sending an authorization request message, identifying a first portion of the payment data and a second portion of the payment data, desensitizing the second portion of the payment data and providing the first portion of the payment data and the desensitized second portion of the payment data to the merchant computer 114 communicatively coupled to the secure card reader 112.

The system configuration discussed in FIGS. 3-4 can be configured to provide transaction authorization and data desensitization without requiring multiple accesses to the payment device (e.g., multiple card swipes). Specifically, the payment device only needs to be accessed once by the dual-purpose integrated POS terminal both for both payment authorization and account tracking. The reduced exposure of track data may reduce the risk of transaction errors or breach of sensitive information. Furthermore, the integrated approach may shorten the overall processing time (e.g., checkout time).

According to some embodiments, techniques described herein can be applied to or integrated with a variety of systems where a payment device containing sensitive information is used for non-payment related purposes. For instance, the methods described herein may be implemented by an access control device such as a check-in kiosk or terminal at an airport or hotel, hotel room door lock, and the like to identify or authenticate cardholders without compromising the sensitive information on the payment device. In particular, information contained in the payment data may be selectively provided on a need-know basis such that only the information required for the access control (e.g., a PAN or a token associated with the PAN or a loyalty number) is extracted and provided to an access control system while the rest of the information is desensitized (e.g., removed or replaced with other non-sensitive information).

Figure 5:
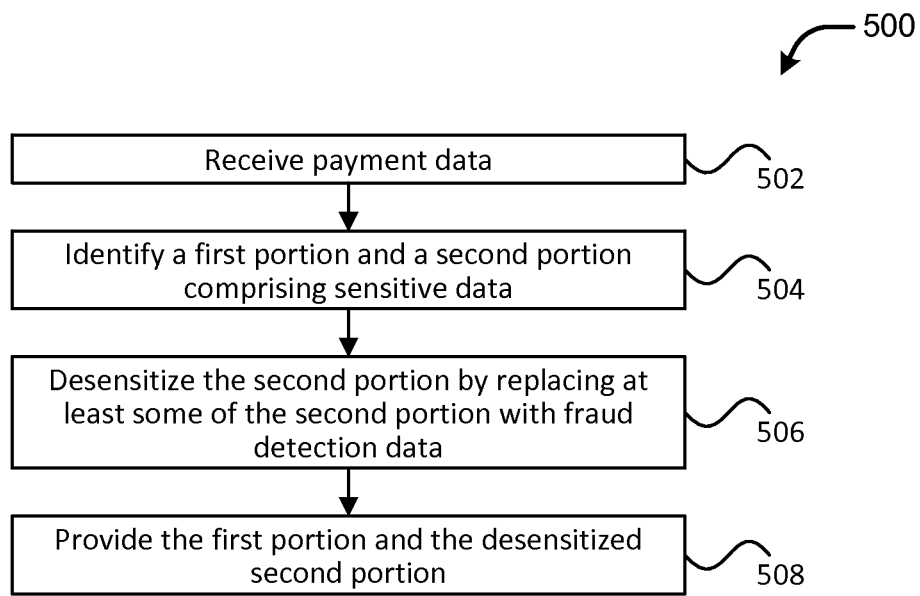
FIG. 5 illustrates an exemplary process for desensitizing payment data, in accordance with embodiments.

FIG. 5 illustrates an exemplary process 500 for desensitizing payment data, in accordance with embodiments. In particular, desensitizing payment data can include replacing some sensitive data with fraud detection data. Aspects of the process 500 may be performed, in some embodiments, by the secured card reader 112 discussed in FIGS. 1-2 or the integrated POS terminal 105 in FIGS. 3-4. Some or all aspects of the process 500 (or any other processes described herein, or variations and/or combinations thereof) may be performed under the control of one or more computer/control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The order in which the operations are described is not intended to be construed as a limitation, and any number of the described operations may be combined in any order and/or in parallel to implement the processes.

The process 500 can include receiving 502 payment data from a payment device. For example, the payment data may be received by the secure card reader 112 when the payment device 102 is swiped or inserted in the slot 202 of the secure card reader 112 with reference to FIG. 2. In some embodiments, a swipe of the payment device 102 may be a second swipe of the payment device 102 at the secure card reader 112 after the first swipe at the POS terminal 104 to perform a financial transaction. In some other embodiments, the secure card reader 112 may be integrated or operably coupled to a check-in kiosk or other access control system such that the swipe of the payment device can be used to identify and/or authenticate the cardholder. In another example, the payment data may be received by the integrated POS terminal 105 when the payment device 102 is swiped or inserted in the slot 302 of the integrated POS terminal 105 with reference to FIG. 4.

The payment data may include track data from the payment device. The track data can include data for one or more tracks in a given format (e.g., ISO 7813). For instance, Track 1 data can include non-discretionary data and discretionary data. The non-discretionary data can include a PAN or a token associated with the PAN, an expiration date, a cardholder name, and a service code. The discretionary data can include sensitive authentication data such as a PVKI, PVV, CVV, or CVC. Track 2 data can include a PAN or a token associated with the PAN, an expiration date, a service code, and discretionary data similar to that for Track 1. In some embodiments, track data can optionally include Track 3 data that may include discretionary and/or non-discretionary data. For example, Track 3 data may include loyalty information or other information for tracking a customer's account.

The process 500 can include identifying 504 a first portion a first portion of the payment data and a second portion of the payment data comprising sensitive information. Identifying the first portion and the second portion of the payment data may include parsing the payment data according to a specific data format (e.g., ISO 7813) so as to retrieve predetermined portions or fields of the payment data. For example, the first portion can include non-discretionary data (e.g., PAN or a token) and the second portion of the payment data may include discretionary data that may need to be desensitized to prevent tampering. In another embodiment, the second portion may also include some non-discretionary data (e.g., PAN or a token, name, expiration date, or service code).

The second portion that has been identified can be desensitized 506 by replacing at least some of the second portion with fraud detection data. In some cases, the remainder of second portion, if any, may be left as is, replaced with zeroes or other predetermined values, or removed. In some other cases, the fraud detection data may extend beyond the second portion. As discussed above, fraud detection data may include any data identifying a particular entity or step involved in a given transaction or a process so as to enable detection a fraud or compromise at the particular entity of step. For instance, fraud detection data can include information identifying when and/or where a given data operation takes place. The data operation may include transmitting, receiving, processing, storing, or retrieving data. Data operation can include data desensitization as discussed herein. Fraud detection data can include information identifying the entity (e.g., a business entity and/or a computing device) associated with a given data operation. Such entity identifying information can include, for example, a merchant identifier that uniquely identifies a merchant, a device or terminal identifier that uniquely identifies a terminal or device, and the like. Such device identifiers may be provided or generated by the manufacturers, merchant service providers, merchants, acquirers, or any suitable entities. Examples of device identifier may include Terminal Identification Identifier (TID) or Terminal Identification Number (TIN) assigned to a POS terminal or workstation, Internet Protocol (IP) address, media access control (MAC) address, and the like. In some cases, the device identifier may be derived based on one or more hardware and/or software parameters of a device identified by the device identifier. Fraud detection data can also include location and/or timing information (e.g., timestamp) associated with certain data operations. Fraud detection data can also include information identifying the data that is handled by an entity such as a summary or a digital signature. Fraud detection data may also include other information such as transaction information including transaction identifier, transaction amount, and the like.

In some embodiments, the fraud detection data may replace at least part of the PAN of the payment data as part of the desensitization process. In some embodiments, the fraud detection data that is used to replace the PAN can be format preserving such that the resulting desensitized PAN is formatted like typical PANs. For instance, the pre-desensitized PAN portion of the payment data and the post-desensitized PAN portion may contain the same or similar number of digits (e.g., 16, 17, 18, or 19 digits). In an example, fraud detection data may replace a portion of the PAN that does not include the IIN or BIN of the PAN and/or the last four digits of the PAN. Format preserving desensitized data may appear genuine to an unauthorized entity who may then attempt to use the desensitized data to commit fraud. When that happens, the fraud detection data may be used to quickly identify the source of the data breach. For example, a real PAN may be "4000123456789010" where the first six digits ("400012") represent the IIN and the remaining ten digits ("3456789010") represent the personal account number. The desensitized PAN may be "4000122323239010", where fraud detection data "232323" is used to replace a portion of the PAN that does not include the IIN or the last four digits of the personal account number. The fraud detection data may identify a specific merchant or data source. Once an authorization computer such as a payment processing computer or an issuer computer receives this number in a payment transaction, the authorization computer may automatically determine that the transaction is fraudulent and can, at the same time, quickly identify the source of the potential data breach based on the fraud detection data. Corrective action can then be taken to secure the data at the potentially breached data source, or investigate how and when the data breach occurred.

In some embodiments, the fraud detection data can be hardcoded, for example, in hardware or firmware. For instance, a device identifier may be stored in a manufacturer-provided Programmable Read Only Memory (PROM) of a POS terminal or card reader. In some other embodiments, the fraud detection data may be dynamically generated. For instance, fraud detection data may include a digital signature that is dynamically generated based on at least a portion of the payment data. As another example, fraud detection data may include a randomly generated number, an updated counter value, or a timestamp. In yet other embodiments, the fraud detection data may be obtained from other sources such as from a remote or local data store, a sensor (e.g., a Global Positioning System (GPS) sensor), a remote control device, and the like. A few examples of replacing data with fraud detection data are shown with reference to the table in FIG. 9.

The desensitized payment data including the first un-desensitized portion and the second desensitized portion can be provided 508. In various embodiments, the desensitized payment data may be provided to any suitable device or system for display, storage, or processing. For example, the desensitized payment data can be provided to a merchant computer or an access control system communicatively coupled to a secure card reader. In an example, the first un-desensitized portion may include a PAN or a token that is unaltered whereas the second desensitized portion may include fraud detection data that replaces at least a portion of the sensitive information included in the second portion. In another example, the second portion can include a portion of a PAN or a token and the portion of the PAN or the token may be replaced with fraud detection data. The sensitive information replaced by the fraud detection data is not provided. The desensitized data may be used for accounting, loyalty programs, or access control purposes without exposing the full track data that may be used for counterfeit purposes. Furthermore, replacing sensitive information at least partially with fraud detection data makes efficient use of space already allocated in the payment data thus allowing more information to be represented by a smaller amount of data.

In some embodiments, the desensitized data can be provided to an authorization computer or a fraud detection system for detecting fraudulent activities on customer accounts. The fraud detection data that is included in the desensitized data can be used to quickly identify the source of potential data breach (e.g., merchant) thereby preventing and/or mitigating potential fraud. For instance, an unauthorized entity that obtains desensitized PAN data that includes some fraud detection data may not realize that the data has been desensitized and attempt to use the desensitized data as payment data to commit fraud. When such desensitized data is received by an authorization computer such as a payment processing computer or an issuer computer, the authorization computer may automatically determine that the transaction is fraudulent and can, at the same time, quickly identify the source of the potential data breach based on the fraud detection data. Corrective action can then be taken to secure the data at the potentially breached data source, or investigate how and when the data breach occurred. For instance, a customer account may be flagged by a merchant or an issuer as potentially compromised. The flagged customer account may be monitored and/or analyzed for fraud activities. As another example, the merchant identified by the fraud detection data may be blacklisted or blocked from future transactions. In some cases, the fraud detection data may be compared with known fraud data that indicates known fraud merchants or compromised merchant terminals so as to detect fraud.

Figure 6:
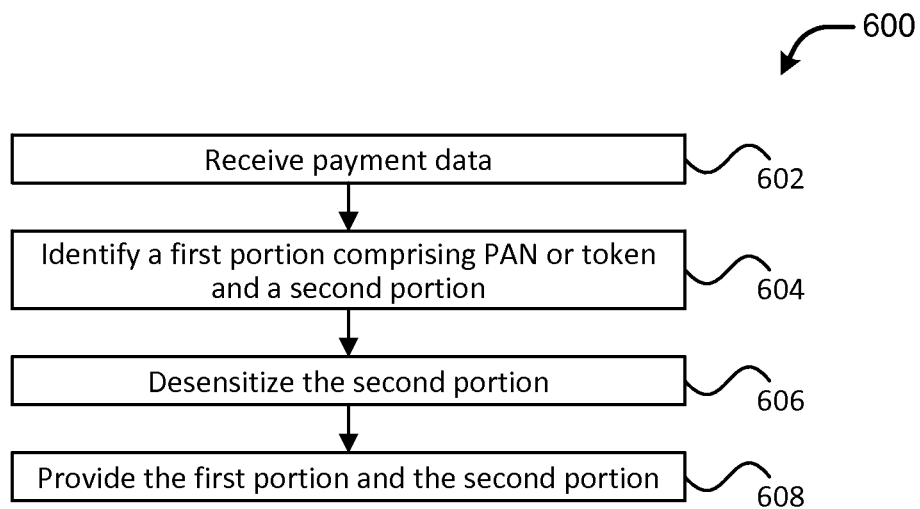
FIG. 6 illustrates another exemplary process for desensitizing payment data, in accordance with embodiments.

FIG. 6 illustrates another exemplary process 600 for desensitizing payment data, in accordance with embodiments. In particular, a PAN or a token of the payment data may be excluded from desensitization. Aspects of the process 500 may be performed, in some embodiments, by the secured card reader 112 discussed in FIGS. 1-2 or the integrated POS terminal 105 in FIGS. 3-4.

The process 600 can include receiving 602 payment data from a payment device in a manner similar to that discussed in step 502 of the process 500.

The process 600 can include identifying 604 a first portion comprising a PAN or a token and a second portion of the payment data. Identifying the first portion and the second portion of the payment data may include parsing the payment data according to a specific data format (e.g., ISO 7813) so as to retrieve predetermined portions of the payment data. For instance, the PAN or token portion may be identified as immediately following the start sentinel "%" and the format code "B" and before the separator "A" in Track 1 data and as immediately following the start sentinel ";" and before the separator "=" in Track 2 data. The second portion may include some or all information after the PAN or token portion. For instance, the second portion may include the name, expiration date, service code, and/or the discretionary data.

The process 600 includes desensitizing 606 the second portion without desensitizing the first portion. The first portion and the second portion may be treated differently for several reasons. In some cases, the first portion may not be desensitized because information contained in the first portion need to be preserved for valid business reasons. For instance, an account identifier such as a PAN or a token is typically needed downstream (e.g., by a merchant computer) for chargeback, accounting, or tracking purposes. Desensitizing the PAN or the token would make such tasks difficult. In some other cases, the first portion may not be desensitized because the information contained in the first portion is not as sensitive as the information in the second portion. For instance, the first portion may include a token that is merely a substitute identifier for a PAN. Exposure of the token would not lead to exposure of the underlying PAN. In some other cases, the first portion may not be desensitized because regulatory requirements regarding data security may not be as stringent for the first portion as for the second portion. For instance, compliance with the Payment Card Industry Data Security Standard (PCI DSS) requires that sensitive authentication data (e.g., CVV) not be stored under any circumstances subsequent to transaction authorization whereas storage of PAN is permitted if encrypted or otherwise protected.

The desensitization of the second portion may include rendering the information in the second portion permanently inaccessible. Rendering the data permanently inaccessible can effectively prevent the data from potential tampering. Furthermore, the data in the second portion can be permanently removed because it is typically not required further downstream (e.g., unlike the PAN) for non-payment related processing. For instance, authentication data such as the CVV is typically only needed for transaction authorization and not for chargebacks, accounting, tracking, access control, or identification purposes. In some embodiments, rendering the information permanently inaccessible may include overwriting at least a portion of the second portion with useless data (e.g., zeroes or any other characters), overwriting at least a portion of the second portion with useful data (e.g., fraud detection data), truncating at least a portion of the second portion, encrypting at least a portion of the second portion and "throwing away" or destroying the cryptographic key, or any combination of the above. A few examples of data desensitization are shown with reference to the table in FIG. 9.

The desensitized payment data including the un-desensitized first portion and the desensitized second portion can be provided 608, for example, to a merchant computer, a local or remote data store, or any other computing device or system. In general, the desensitized payment data can be provided for display, storage, processing, or otherwise use by any suitable device or system. In some embodiments, the desensitized data can be provided to an authorization computer or a fraud detection system for detecting fraudulent activities on customer accounts. For instance, when an unauthorized entity uses the desensitized data as payment data to commit fraud, the desensitized data may be analyzed by the authorization computer to detect fraud. For example, the mere presence of zeroes (or other invalid values) instead of valid values in the desensitized data can indicate that the data is being misused by an unauthorized entity for illicit purposes. Upon detection of fraud based on the desensitized data, corrective actions may be taken to prevent or mitigate fraud. For instance, a merchant computer or authorization computer may flag a customer account as high-risk or compromised and may subject the flagged account for further analysis or monitoring. Alternatively or additionally, the desensitized data may include fraud detection data that identifies the source of the data breach (e.g., merchant) that further facilitates that detection and/or prevention of fraud. For example, the presence of the fraud detection data alone may indicate fraud, similar to the presence of zeroes or other invalid values. For example, the discretionary data field of the desensitized data may contain fraud detection data instead of CVV as required for authorization. Additionally, the fraud detection data may identify a merchant or merchant terminal that originates the payment transaction. Such a merchant or merchant terminal identified may be blacklisted or blocked (e.g., by a payment processing system or an issuer) from future transactions as part of the corrective actions that may be taken to prevent future fraud.

Figure 7:
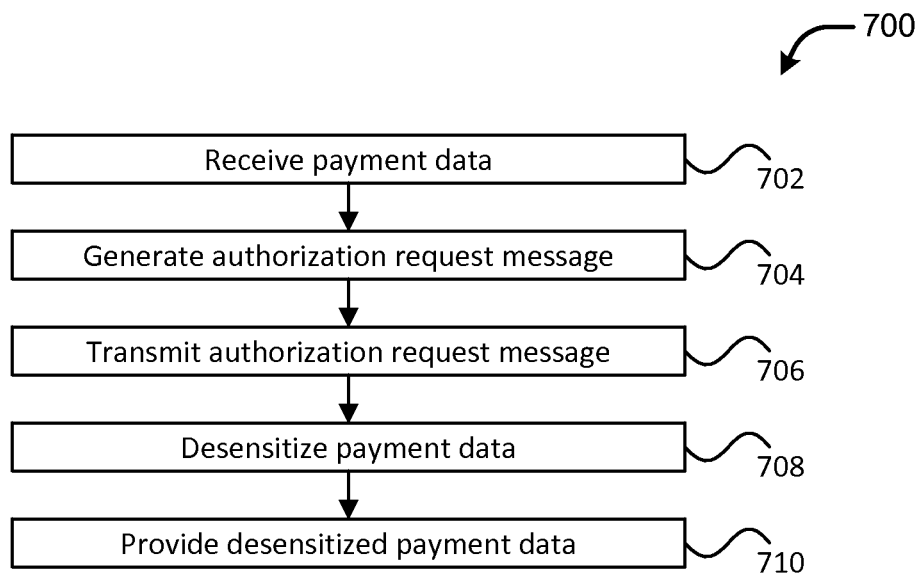
FIG. 7 illustrates another exemplary process for desensitizing payment data, in accordance with embodiments.

FIG. 7 illustrates another exemplary process 700 for desensitizing payment data, in accordance with embodiments. Aspects of the process 700 may be performed, in some embodiments, by the integrated POS terminal 105 in FIGS. 3-4 or by the system 100 in FIG. 1.

The process 700 can include receiving 702 payment data in a manner similar to that discussed in step 502 of the process 500. For example, a consumer may perform a first swipe of their payment card at a POS terminal or may wave or tap their payment device at a contactless reader to initiate a financial transaction.

An authorization request message may be generated 704 and transmitted 706 (e.g., to an acquirer computer). In some embodiments, the authorization request message may include the payment data and transaction data. For example, the transaction data may include a transaction amount, a merchant identifier, a number of items, a date and time of the transaction and any other relevant information. The authorization request message may be forwarded (e.g., by the acquirer computer) to a payment processing network, which may forward the authorization request message to an issuer computer for authorization. The issuer computer may process the authorization request message to determine if the transaction is to be approved or declined. The issuer computer may generate an authorization response message with the authorization results and send the authorization response message to the integrated POS terminal via the payment processing network and the acquirer computer.

The payment data may be desensitized 708 and provided 710 (e.g., to a merchant computer, a data store, or any other computing device) for accounting, tracking, identification, access control, and/or fraud detection purposes. In some embodiments, steps 708 and 710 can be implemented in a manner similar to the steps 506 and 508 of FIG. 5 or the steps 606 and 608 of FIG. 6 above. For instance, desensitized data that deviates from valid payment data but misused as payment data may be detected by a merchant computer or an authorization computer (e.g., payment processing computer or issuer computer) to identify an unauthorized entity. Furthermore, when desensitized data includes fraud detection data, the fraud detection data can be used to further expedite the fraud detection process, for example, with merchant identifying information. Once fraud is detected based on the desensitized data, any suitable corrective action may be taken by any appropriate entity. For instance, an account may be analyzed, monitored, blacklisted, or otherwise acted upon by a merchant, an acquirer, a payment processor, or an issuer.

The order in which the operations are described is not intended to be construed as a limitation, and any number of the described operations may be combined in any order and/or in parallel to implement the process 700. For instance, in some embodiments, steps 708 and/or 710 can be performed in parallel with the steps 704 and/or 706. In other words, the desensitization of the payment data can be performed in parallel with the payment authorization processing. In other embodiments, steps 708 and/or 710 can be performed before or after the steps 704 and/or 706.

Figure 8:
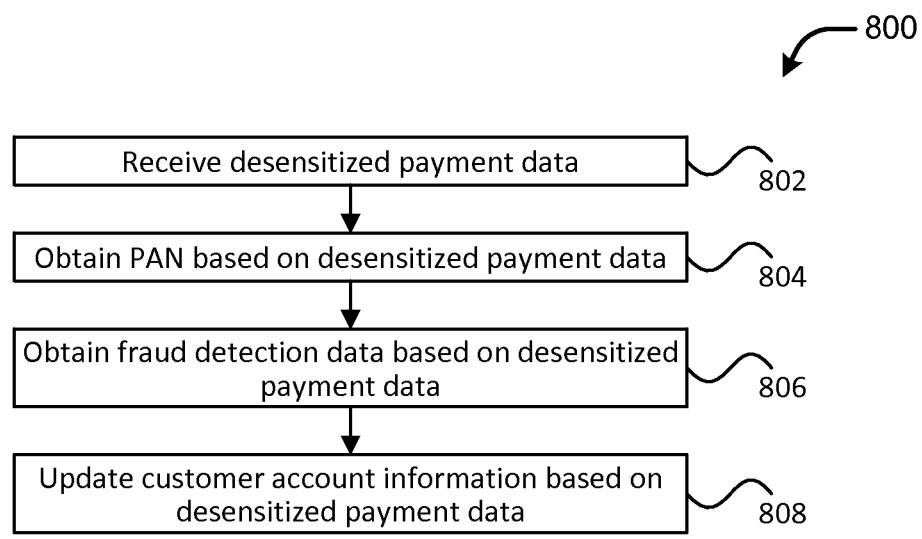
FIG. 8 illustrates an exemplary process for implementing customer account tracking, in accordance with embodiments.

FIG. 8 illustrates an exemplary process 800 for implementing customer account tracking, in accordance with embodiments. Customer account tracking may be performed based on desensitized payment data such as described herein. Aspects of the process 800 may be performed, in some embodiments, by the merchant computer 114 in FIGS. 1 and 3.

The process 800 can include receiving 802 desensitized payment data such as provided by a secure card reader 112 of FIGS. 1-2 or an integrated POS terminal 105 of FIGS. 3-4. The payment data may have been desensitized using methods discussed herein (e.g., in FIGS. 5-7).

The process 800 can include obtaining 804 a PAN based on the desensitized payment data. The desensitized payment data may include a first portion that is un-desensitized and a second portion that has been desensitized. The first portion of the desensitized payment data may include a PAN or a token. When a PAN is present in the first portion of the desensitized payment data, the PAN may be extracted. When a token present in the first portion instead of a PAN, a PAN may be obtained based on the token. For instance, the token may be extracted from the first portion of the desensitized payment data and used to look up the corresponding PAN based on a map or other data structure that stores the mapping between tokens and corresponding PANs. Such a mapping may be stored in a token vault maintained by a token issuer such as discussed in FIG. 10. A merchant computer may communicate with the token issuer to obtain the PAN corresponding to the token. In an alternatively embodiment, a token may be extracted from the first portion of the desensitized payment data and used as-is for customer account tracking purposes instead of using the underlying PAN.

Where the desensitized payment data is generated by replacing sensitive information with fraud detection data (such as discussed in FIG. 5), the process 800 can optionally include obtaining 806 fraud detection data based on the desensitized payment data. For instance, the fraud detection data may be extracted from a predetermined portion (e.g., discretionary data portion) of the desensitized payment data. The fraud detection data may include a merchant identifier, a device identifier, a location identifier, a timestamp, and the like, or any combinations thereof.

Based at least in part on the desensitized payment data, customer account information may be updated 808. In some embodiments, customer account information may be identified or retrieved by a PAN or a payment token associated with the customer account. The customer account information may be updated to with the fraud detection data (e.g., merchant identifier, merchant device identifier, etc.). In some embodiments, the desensitized payment data may include other un-desensitized information that may be extracted and used to update customer account information. For instance, such un-desensitized data can include a loyalty program number, transaction details (e.g., transaction amount), and the like. In some cases, the fraud detection data extracted from the desensitized payment data may be used to determine whether the customer account should be flagged, suspended, monitored, or otherwise acted upon. For instance, the fraud detection data may be compared with known fraud data that indicates known fraud merchants or compromised merchant terminals. If there is a match, then the customer account may be flagged as potentially compromised, suspended, and/or monitored for fraudulent activities. In some examples, the known fraud data may be obtained from a data store or fraud detection system that may be communicatively coupled to the device that receives the desensitized data.

FIG. 9 illustrates a table 900 with examples of desensitization of some portions of payment data, in accordance with embodiments.

Entries 902 and 904 illustrate example payment data comprising Track 1 and Track 2 data before and after desensitization. As illustrated in entry 902, the pre-desensitization Track 1 data is "% B4000123456789010^SMITH/JOHN^16071021473810559010203?", where "4000123456789010" is a PAN or a token, "^" is a separator, "SMITH/JOHN" is a cardholder name, "1607" is an expiration date (July, 2016), "102" is a service code, and "1473810559010203" is the discretionary data. Pre-desensitization Track 2 data is ";4000123456789010=160710212423468?", where "4000123456789010" is a PAN or a token, "=" is a separator, "1607" is the expiration date (July, 2016), "102" is a service code, and "12423468" is the discretionary data. Exemplary post-desensitization data is shown in entry 904. A first portion of the track data that is not desensitized can include the PAN or token ("4000123456789010") and the second portion that is desensitized can include the remaining data portions (e.g., name, expiration data, service code, discretionary data). As illustrated, desensitization can include zeroing out the data to be desensitized. In some embodiments, the desensitization data may include other values.

Entries 906 and 908 illustrate example payment data comprising Track 1, Track 2, and Track 3 data before and after desensitization. As illustrated in entry 906, Track 1 and Track 2 data may be similar to the Track 1 and Track 2 data shown in entry 902. Track 3 data may comprise loyalty data (e.g., "81293812") used for tracking loyalty programs. As shown by entry 908, the Track 1 and Track 2 data may be desensitized similar to the desensitization of Track 1 and Track 2 data in the example above. However, Track 3 data may be excluded from desensitization because it does not include sensitive information. Thus, in this example, the post-desensitization data only includes the PAN or the token and loyalty data that may not be sufficient for counterfeit purposes in case the merchant computer is targeted by a keylogger or a hacker.

Entry 910 illustrates exemplary Track 1 and Track 2 data after desensitization, where sensitive information is replaced with fraud detection data. The fraud detection data may include a merchant identifier "93787221". The fraud detection data may be used to replace desensitized data at any suitable location. For instance, as illustrated, the merchant identifier is provided in the desensitized portion of the Track 1 data. The rest of the sensitive data may be desensitized (e.g., zeroed out) similar to entry 904.

Entry 912 illustrates more exemplary Track 1 and Track 2 data after desensitization, where sensitive information is replaced with fraud detection data. The fraud detection data may include a merchant identifier "93787221" as well as a terminal identifier "7263859264725928" (e.g., associated with a POS terminal). The merchant identifier may be put in desensitized portion of Track 2 whereas the terminal identifier may be put in the desensitized portion of Track 1. In various embodiments, the fraud detection data may be used to identify a merchant, a terminal, or a location, making it easier to identify hacked merchant terminals.

Entry 914 illustrates more exemplary Track 1 and Track 2 data after desensitization, where sensitive information is replaced with fraud detection data. In this example, the fraud detection data "232323" replaces a portion of the PAN or token. The fraud detection data replaces the portion of the PAN or token that does not include the IIN or BIN of the PAN or token and/or the last four digits of the PAN or token, so that the IIN or BIN and/or the last four digits of the PAN or token can still be extracted from the desensitized data, for example, for identification or tracking purposes.

Entry 916 illustrates more exemplary Track 1 and Track 2 data after desensitization, where sensitive information is replaced with fraud detection data. In this example, the fraud detection data "23232323" replaces a portion of the PAN or token that includes part of the IIN or BIN of the original PAN or token ("400012") but leaves the last four digits of the PAN or token unmodified so that the last four digits of the PAN or token can still be extracted from the desensitized data, for example, for identification or tracking purposes. In yet other embodiments, the fraud detection data may replace a portion of the last four digits of the original PAN or token, or both the IIN portion and the last four digits of the original PAN or token.

In some embodiments, the desensitized data may be format preserving. That is, the resulting desensitized data may retain the same format (e.g., number of digits for various portions) as the original pre-desensitized data. Such format preserving desensitized data may not be apparent to unauthorized entities who may then attempt to use the desensitized data as payment data to commit fraudulent transactions. When that happens, the fraud detection data included in the desensitized data can be used to quickly identify the source of the breach and prevent or mitigate potential data breach.

Embodiments of the invention are directed to a secure card reader that can automatically zero out discretionary data, so that if the merchant terminal is compromised, the full track data from the payment card is not obtained. Additionally, the secure card reader can replace the discretionary data with information that can identify the merchant, the merchant terminal or location, making it easier to identify hacked terminals. By desensitizing the discretionary data, attacks, for example, using USB keyloggers or malware keyloggers, may be rendered unsuccessful at the merchant terminal since the full track data may not be available for making counterfeit cards. The desensitized data may be provided to the merchant back-end system for processing related to loyalty programs, accounting, charge-back monitoring, etc. without compromising the full track data.

Figure 10:
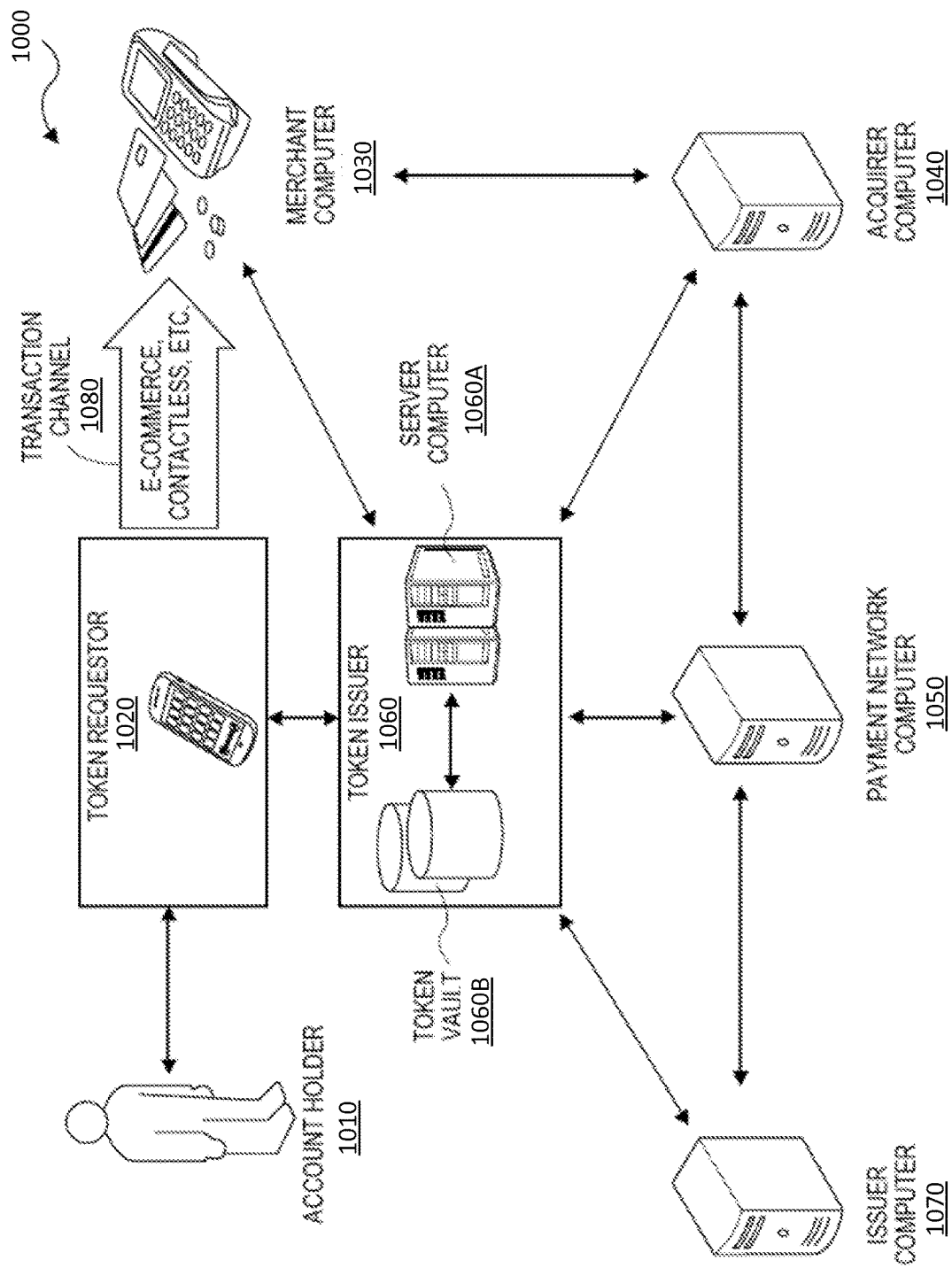
FIG. 10 depicts a block diagram illustrating a transaction processing system according to an embodiment of the present invention.

FIG. 10 depicts a block diagram illustrating a transaction processing system 1000 according to an embodiment of the present invention. For simplicity of illustration, a certain number of components are shown is shown in FIG. 10. It is understood, however, that embodiments of the invention may include more than one of each component. In addition, some embodiments of the invention may include fewer than all of the components shown in FIG. 10. In addition, the components in FIG. 10 may communicate via any suitable communication medium (including the Internet), using any suitable communications protocol.

The transaction processing system 1000 may comprise an account holder 1010 that may use a token requestor device 1020 to request a payment token. Although the token requestor device 1020 is operated by the account holder 1010 in FIG. 10, it can be operated by any other suitable entity including a merchant, an acquirer, etc. As shown in FIG. 10, the token requester device 1020 may be in communication with a merchant computer 1030 and a token issuer computer system 1060. The token issuer computer system 1060, a merchant computer 1030, an acquirer computer, a payment network computer 1050, and an issuer computer 1070 may all be in communication with each other. The various entities may be capable of communicating over any suitable network connection or communications system including the Internet and/or any cellular telephone network.

The token issuer computer system 1060 may include a token issuer server computer 1060A, and a token vault 1060B and rules database 1060C coupled to the token issuer computer 1060A. In some embodiments, the token issuer computer system 1060 may be characterized as token issuer and a token verifier. In other embodiments, the token issuer and the token verifier may be separate entities, where the token issuer can generate tokens, while the token verifier can validate or verify tokens issued by the token issuer.

The transaction processing system 1000 may further comprise an acquirer computer 1040, a payment network computer 1050 and an issuer computer 1070. The token requestor device 1020 may be configured to communicate with the merchant computer 1030, the acquirer computer 1040, the payment network computer 1050, and the issuer computer 1070 through a transaction channel 1080. The transaction channel 1080 may include a communication path between one or more of the token requestor device 1020, the merchant computer 1030, the acquirer computer 1040, the payment network computer 1050, and the issuer computer 1070. The transaction channel 1080 may be a communication channel, which allows for communication with the issuer computer 1070 during an electronic payment transaction The transaction channel 1080 may include one or more sub-channels. Sub-channels 1080A that may provide for communication between the token requestor device 1020 and the merchant computer 10 may include a contactless or contact communication sub-channel between the merchant computer 1030 and the token requester device 1020. They may also include a communication sub-channel between the merchant computer 1030 and the token requester device 1020 that utilizes a communication network such as the Internet.

The account holder 1010 can be a user of a portable consumer device (e.g., a credit card). The account holder 1010 may also be referred to as a "consumer" in some contexts. The account holder 1010 may utilize a communication device (e.g., a mobile phone) that can serve as the token requestor device 1020 during a transaction with a merchant.

The token requestor device 1020 may be a device that can request a payment token. In some embodiments, it may be associated with a payment account of the account holder 1010. The token requestor device 1020 may be, without limitation, a mobile device such as a mobile phone, a tablet, a PDA, a notebook computer, a key fob, or any suitable device. In other embodiments, the token requestor device 1020 may be a stationary device such as a desktop computer. In some embodiments, the token requestor device 1020 may include a digital or mobile wallet and/or a payment application that may be associated with one or more payment accounts of the account holder 1010. In some embodiments, the token requestor device 1020 may be configured to display a machine readable code such as a QR code or barcode. The token requestor device 1020 may also include a camera or a scanning device capable of scanning machine readable code.

Although not shown in FIG. 10, in some embodiments, the account holder 1010 may use a token requestor device 1020 to interface with a token requestor that may be provided through a remote computer (e.g., mobile wallet provider), etc. Accordingly, the account holder 1010 may use token requestor device 1020 to obtain a token that is stored by a remote server computer operated by a mobile wallet provider that may have previously obtained a payment token from a token issuer computer system 1060. Accordingly, there may be multiple token requestor devices in some embodiments and/or a communication device of the account holder 1010 (e.g., mobile device, laptop computer, desktop computer) that may be used to provide a previously requested token to a merchant computer 1030.

The merchant computer 1030 may be associated with a merchant. The merchant computer 1030 may be an access device such as a POS terminal at a merchant location, a computer coupled with an access device of a merchant, or a remote server computer that hosts and/or operates a web site operated by the merchant. In some embodiments, the merchant operating the merchant computer 1030 may be a card-on-file (COF) merchant. The card-on-file merchant may store account information for the account holder 1010 in a remote database for future payments (e.g., recurring or periodic payments). The merchant computer 1030 may be configured to generate an authorization request message for a transaction that is initiated by the account holder 1010.

The acquirer computer 1040 may be operated by an acquirer. An acquirer is typically a system for an entity (e.g., a bank) that has a business relationship with a particular merchant, a wallet provider or another entity. The acquirer computer 1040 may be communicatively coupled to the merchant computer 1030 and the payment network computer 1050 and may issue and manage an account of the merchant. In some embodiments, the acquirer computer 1040 may forward the authorization request message to the payment network computer 1050 and the authorization response message to the merchant computer 1030 during a transaction to confirm processing of a payment transaction.

The payment network computer 1050 may be configured to provide authorization services, and clearing and settlement services for payment transactions. A payment network computer 1050 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system that processes authorization requests and a Base II system that performs clearing and settlement services. Furthermore, the payment processing network may include a server computer and may use any suitable wired or wireless telecommunications network, including the Internet. In some embodiments, the payment network computer 1050 may forward an authorization request received from the acquirer computer 1040 to the issuer computer 1070 via a communication channel. The payment network computer 1050 may further forward an authorization response message received from the issuer computer 1070 to the acquirer computer 1040.

The issuer computer 1070 may be operated by an account issuer. Typically, the account issuer is an entity (e.g., a bank) that issues and maintains an account of the account holder 1010. The account may be a credit, debit, prepaid, or any other type of account.

In some embodiments, the issuer computer 1070 may be a computer comprising a processor and a tangible non-transitory computer readable medium coupled to the processor. The tangible non-transitory computer readable medium may comprise code, executable by the processor, for implementing a method. The method comprises receiving from a token issuer computer a user interface for providing a set of parameters to generate a payment token request rule. The method further comprises generating the set of parameters and sending the set of parameters to the token issuer computer.

The token issuer computer system 1060 may be a stand-alone entity or may be coupled to, integrated into, and/or operated or managed by any of the entities shown in FIG. 10. The token issuer computer system 1060 may issue tokens and may verify the status of tokens. In such cases, the token issuer computer system 1060 may alternatively be referred to as a token verifier or token issuer. Additionally, in some embodiments, the token issuer and the token verifier may include separate entities and/or systems that may be configured to issue or generate tokens and validate or verify tokens.

Figure 11:
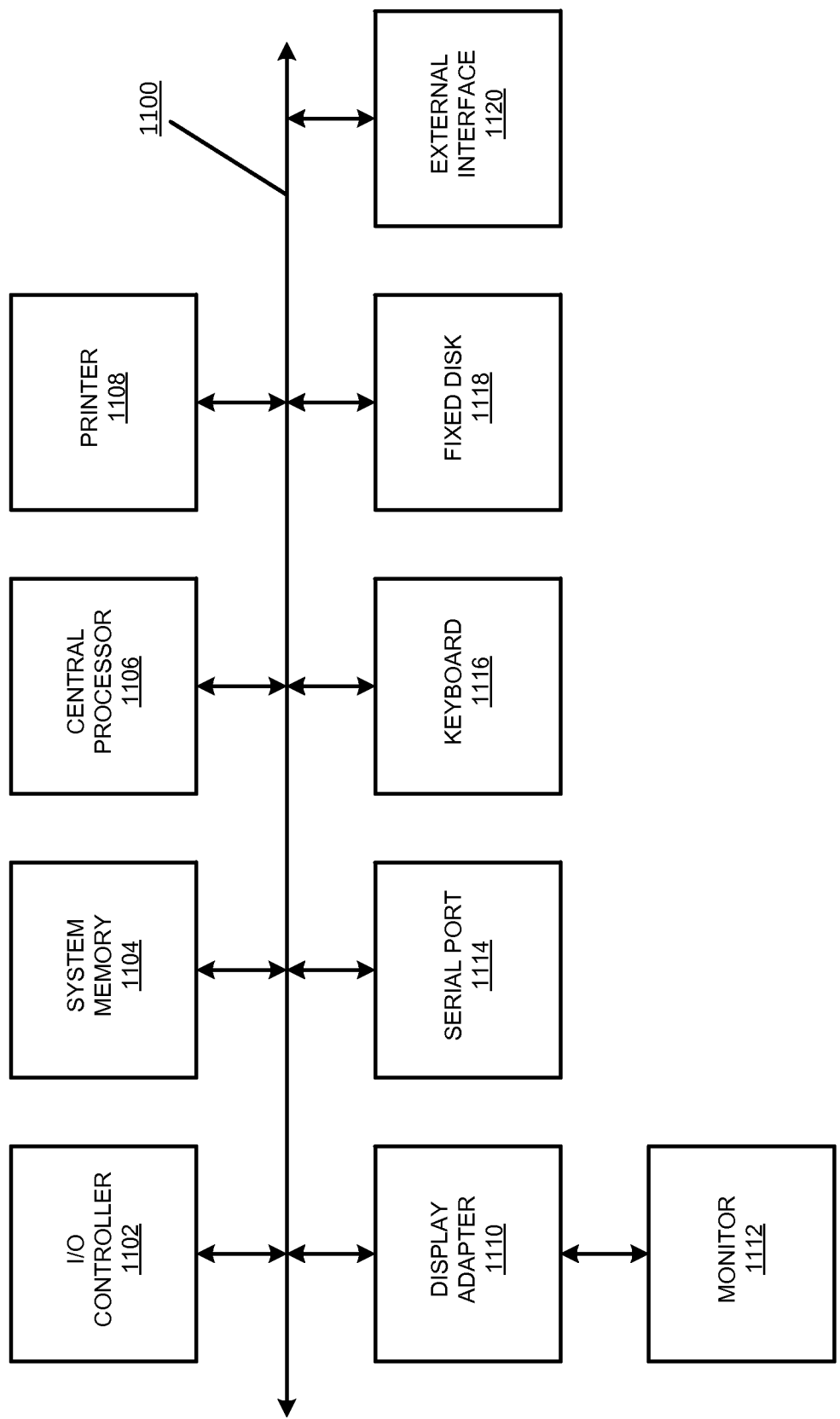
FIG. 11 illustrates a block diagram of a computer apparatus.

Examples of such subsystems or components are shown in FIG. 11. Any of the subsystems or components shown in FIG. 11 can be included in any of the previously described devices, apparatuses, or systems. The subsystems shown in FIG. 11 are interconnected via a system bus 1100. Additional subsystems such as a printer 1108, keyboard 1114, fixed disk 1116 (or other memory comprising computer readable media), monitor 1120, which is coupled to display adapter 1110, and others are shown. Peripherals and input/output (I/O) devices, which couple to I/O controller 1102 (which can be a processor or other suitable controller), can be connected to the computer system by any number of means known in the art, such as serial port 1112. For example, serial port 1112 or external interface 1118 can be used to connect the computer apparatus to a wide area network such as the Internet, a mouse input device, or a scanner. The interconnection via system bus allows the central processor 1106 to communicate with each subsystem and to control the execution of instructions from system memory 1104 or the fixed disk 1116, as well as the exchange of information between subsystems. The system memory 1104 and/or the fixed disk 1116 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

Any recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method performed by a loyalty data card reader configured to track consumer loyalty data from a payment device, the method comprising:

receiving, by the loyalty data card reader, the payment device at a first time;

scanning, by the loyalty data card reader, the received payment device;

retrieving, by the loyalty data card reader, device data from the scanned payment device;

sending, by the loyalty data card reader, the retrieved device data to a server computer;

receiving, by the loyalty data card reader, the payment device at a second time;

re-scanning, by the loyalty data card reader, the received payment device for device data at the second time;

retrieving, by the loyalty data card reader, from the re-scanned payment device a first portion of the device data comprising customer loyalty data and a second portion of the device data comprising payment information;

desensitizing, by the loyalty data card reader, the second portion of the device data by removing the payment information and replacing at least some of the payment information with fraud detection data; and providing, by the loyalty data card reader, the first portion of the device data comprising the customer loyalty data and the desensitized second portion of the device data to a host computer communicatively coupled to the loyalty data card reader.

2. The method of claim 1, wherein the first portion of the device data comprises a primary account number or a payment token associated with the primary account number.

3. The method of claim 1, wherein the second portion of the device data includes discretionary data.

4. The method of claim 3, wherein the discretionary data includes a Card Verification Value (CVV).

5. The method of claim 1, wherein desensitizing the second portion of the device data further comprises replacing the second portion of the device data with zeroes.

6. The method of claim 1, wherein the fraud detection data is indicative of a merchant, a merchant terminal, a location, or timing information associated with the device data.

7. The method of claim 1, further comprising generating an authorization request message based on the device data and transmitting the authorization request message to an acquirer computer communicatively coupled to the loyalty data card reader.

8. A method performed by a loyalty data card reader configured to track consumer loyalty data from a payment device, the method comprising:

receiving, by the loyalty data card reader, the payment device at a first time;

scanning, by the loyalty data card reader, the received payment device;

retrieving, by the loyalty data card reader, device data from the scanned payment device;

sending, by the loyalty data card reader, the retrieved device data to a server computer;

receiving, by the loyalty data card reader, the payment device at a second time;

re-scanning, by the loyalty data card reader, the received payment device for device data at the second time;

retrieving, by the loyalty data card reader, from the re-scanned payment device a first portion of the device data comprising customer loyalty data and a second portion of the device data comprising payment information;

desensitizing, by the loyalty data card reader, the second portion of the device data by removing the payment information; and providing, by the loyalty data card reader, the first portion of the device data comprising the customer loyalty data and the desensitized second portion of the device data to a device communicatively coupled to the loyalty data card reader.

9. The method of claim 8, wherein desensitizing the second portion of the device data comprises replacing at least some of the second portion of the device data with zeroes.

10. The method of claim 8, wherein desensitizing the second portion of the device data comprises replacing at least some of the payment information with fraud detection data.

11. The method of claim 10, wherein the fraud detection data comprises a merchant identifier or a device identifier.

12. The method of claim 8, wherein the payment information includes discretionary data.

13. The method of claim 8, wherein the loyalty data card reader is not configured to transmit a payment authorization request.

14. The method of claim 8, wherein the loyalty data card reader is part of at least one of a merchant terminal, a hotel room door, or an airline check in kiosk.

15. A secure loyalty data card reader configured to track consumer loyalty data from a payment device comprising a processor and a computer readable medium coupled to the processor, the computer readable medium comprising code for causing the processor to:

receive the payment device at a first time;

scan the received payment device;

retrieve device data from the scanned payment device;

send the retrieved device data to a server computer;

receive the payment device at a second time;

re-scan the received payment device for device data at the second time;

retrieve from the re-scanned payment device a first portion of the device data comprising customer loyalty data and a second portion of the device data comprising payment information;

desensitize the second portion of the device data by removing the payment information; and provide the first portion of the device data and the desensitized second portion of the device data to a device.

16. The secure loyalty data card reader of claim 15, wherein desensitizing the second portion of the device data comprises replacing at least some of the second portion of the device data with zeroes.

17. The secure reader of claim 15, wherein desensitizing the second portion of the device data comprises replacing at least some of the payment information with fraud detection data.

18. The secure reader of claim 17, wherein the fraud detection data comprises a merchant identifier or a device identifier.

19. The secure reader of claim 15, wherein the payment information includes discretionary data.

20. The secure reader of claim 15, wherein the code further causes the processor to: generate an authorization request message based on the device data; and transmit the authorization request message to an acquirer computer communicatively coupled to the secure reader.

21. The method according to claim 1, wherein the payment information comprises a consumer name, a CVV or a CVC, and wherein replacing the payment information with the fraud detection data comprises replacing the payment information with a predetermined numerical value.

22. The method according to claim 1, wherein removing the payment information comprising permanently removing the payment information in order to render the payment information inaccessible.

23. The method according to claim 1, wherein the loyalty data card reader is a plug-and-play device connectable to a point-of-sale reader.

\* \* \* \* \*